April 10, 1962 G. JORMAN ETAL 3,028,681
APPARATUS FOR TREATING GRANULAR MATERIALS
Filed March 26, 1959
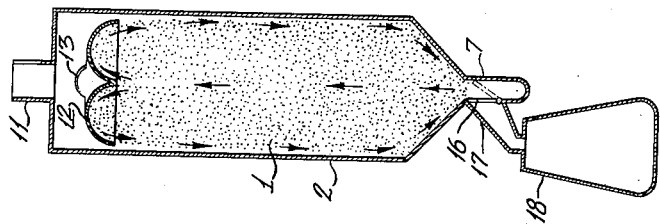
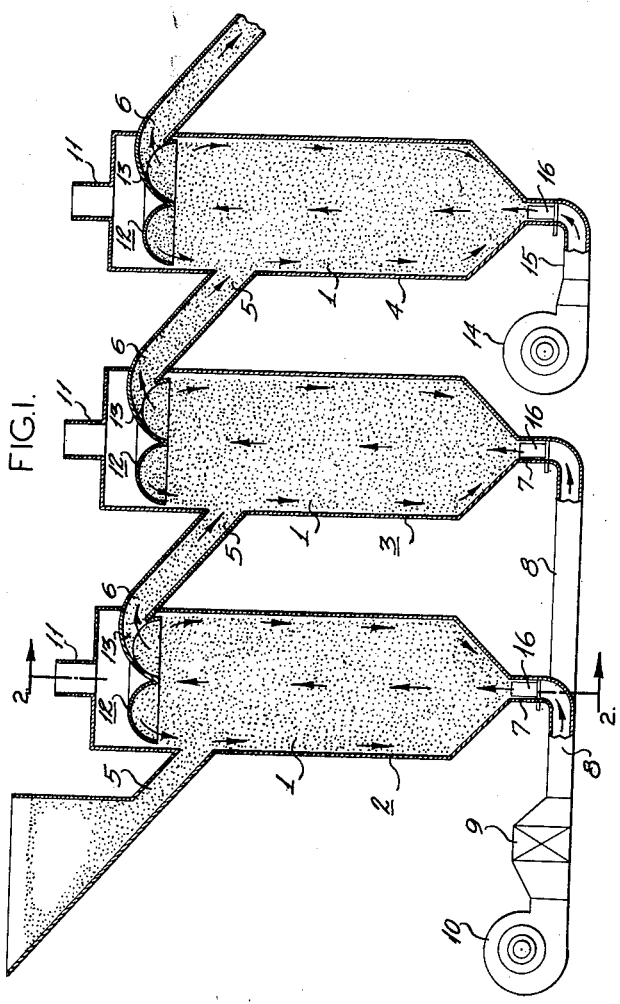
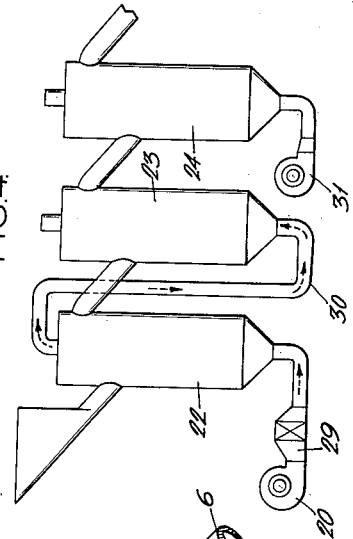
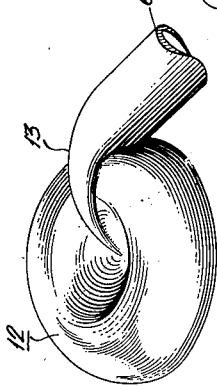
INVENTORS:
GÖTE JORMAN
GUSTAV ÖHOLM
BY Howson & Howson
ATTYS.

United States Patent Office 3,028,681
Patented Apr. 10, 1962

3,028,681
APPARATUS FOR TREATING GRANULAR MATERIALS
Göte Jorman, Orebro, and Gustav Öholm, Bromma, Sweden, assignors to Aktiebolaget Svenska Flaktfabriken, Stockholm, Sweden
Filed Mar. 26, 1959, Ser. No. 802,084
Claims priority, application Sweden Apr. 1, 1958
3 Claims. (Cl. 34—57)

The present invention relates to a method and an apparatus for drying or otherwise treating granular materials, preferably grain, in a vertical, substantially cylindrical container, to which container a treating medium is centrally supplied at the bottom of the container with such a velocity that the material is caused to circulate rapidly in an upwardly directed central current and more slowly in a peripheral downwardly directed current.

When constructing driers for grain it is always preferred that the drying time be as short as possible in order to keep the volume of the drier as small as possible. The reason for this is that when there is a need for drying relatively small quantities, this can not be carried out economically if the drier has too great a volume. Another desire is for easy cleaning of the drying apparatus when changing to another kind of grain; the drying apparatus, if possible, being self-emptying. By the method and the apparatus according to the invention a short drying time is obtainable, thanks to the intensive air flushing, to which the grains are exposed especially during their movement upwards. Furthermore, the apparatus can easily be made to be entirely self-emptying.

The invention is characterized in that the untreated material is supplied into the upper part of the container in the peripheral downwardly directed material current and is discharged from the upper layer of the material column preferably from the upwardly directed central material current. The material can thereafter be conducted through two or more containers in series and be supplied into and discharged from each container in the manner described. The method is usually carried out in such a manner that the material is treated by means of heated air for the purpose of drying in one or more of the containers and thereafter is cooled in the last container by means of cool air.

A suitable apparatus of the invention consists of a vertical, substantially cylindrical container provided with openings for the supply and discharge of the material. The container at its bottom is connected to means for supplying and, if desired, conditioning of a treating medium and at its top is provided with an outlet for said medium. The apparatus according to the invention is characterized in that the opening for the supply of the materal is arranged in the cylindrical wall of the container at the top of the same and in that the discharge opening for the material is arranged in said wall at the same level as the upper layer of the material column and located substantially diagonally opposite the supply opening. Above the uppermost material layer there is arranged a circular baffle formed to deflect and guide the central material current uniformly towards the periphery of the container and to guide a part of the material out towards said discharge opening for the material from the container.

Other characteristics for the apparatus will be evident from the claims and the accompanying description of the drawing figures, in which:

FIG. 1 is a vertical longitudinal cross section through an apparatus according to the invention embodying three containers in series;

FIG. 2 is a transverse cross section taken on the line 2—2 of FIG. 1;

FIG. 3 is a perspective view of the circular baffle shown in FIGS. 1 and 2; and

FIG. 4 is a side elevation at a reduced scale of a modification of the apparatus shown in FIGS. 1 and 2.

In the drawing, the material 1 is to be treated in the containers 2, 3 and 4. Each container is provided with an opening 5 for supplying the material and an opening 6 for discharging the material. The treating medium is supplied through an opening 7 connected to a supply duct 8 for the treatment medium which is conditioned, for instance in a heating element 9 and supplied by means of a blower 10. An outlet opening 11 in the roof of each container is provided for the discharge of the used treating medium, and a circular baffle 12 is arranged in the upper part of the container, which has a deflector 13 arranged to guide a part of the material outwards to the opening 6. In the illustrated embodiment it is assumed that the containers 2 and 3 are used for drying, whereas the container 4 is used for cooling the material. For this reason the container 4 is connected to a separate ventilator 14 by means of a duct 15.

The dryer is self-emptying, for example, by inclusion of the elements 16, 17 and 18.

Without departing from the invention all the containers can be connected to separate blowers. Likewise the container may be mutually connected in such a manner that the treating medium is caused to pass through two or more containers in series as shown in FIG. 4. In this figure, the containers are designated 22, 23, and 24. A fan 20 is connected to the inlet of the container 22 through a conditioning unit 29, and a conduit 30 leads from the outlet of the container 22 to the inlet of the container 23. A fan 31 is connected to the container 24 as shown.

What we claim is:

1. Apparatus for treating granular materials comprising at least one vertical substantially cylindrical container having means including an axial inlet duct to supply a treating medium centrally at the bottom thereof with such an upward velocity as to cause the material to circulate in a relatively rapidly moving upward spout of solid particles in the central portion of said container and a relatively slow downward movement of the particles in the remainder of said container, means defining an inlet opening in the cylindrical side wall of the container adjacent the top thereof to supply material thereto, a means defining a discharge opening for the material in the said side wall substantially diagonally opposite said inlet opening at a higher level, and means defining an outlet opening for the treating medium in the top wall of said container, said apparatus including a circular baffle disposed coaxially within the container above the discharge opening and formed to deflect and guide a major portion of the central spout of material particles uniformly toward the periphery of the container, said baffle having a portion opening into said discharge opening and formed to guide the remainder of said central spout of material outwardly into said discharge opening.

2. Apparatus according to claim 1 wherein each container is provided with a conical bottom wall, said means to supply the treating medium being disposed centrally in said bottom wall.

3. Apparatus according to claim 2 comprising at least two containers in series and characterized in that the last container of said series is provided with separate means for supplying unconditioned treating medium for cooling the material.

References Cited in the file of this patent

UNITED STATES PATENTS

| | | |
|---|---|---|
| 1,635,527 | Barthelmess | July 12, 1927 |
| 1,648,005 | Pritchard | Nov. 8, 1927 |
| 2,055,385 | Noack | Sept. 22, 1936 |
| 2,118,078 | Flugel | May 24, 1938 |
| 2,582,710 | Martin | Jan. 15, 1952 |
| 2,689,973 | Lee et al. | Sept. 28, 1954 |
| 2,843,942 | Whitsel | July 22, 1958 |
| 2,876,557 | Ducatteau | Mar. 10, 1959 |